Patented July 11, 1933

1,917,253

UNITED STATES PATENT OFFICE

ALBERT K. EPSTEIN AND BENJAMIN R. HARRIS, OF CHICAGO, ILLINOIS

MARGARINE EMULSION AND PRODUCT TO BE USED THEREIN

No Drawing.   Application filed October 31, 1930. Serial No. 492,612.

Our invention relates in general to emulsion improving substances, and margarine emulsions resulting from the use of such substances. More specifically, our invention has to do with novel substances adapted to be used in margarine, together with the margarine having such substances incorporated therewith.

The principal object of our present invention is the production of an improved margarine.

Another object is to produce a margarine improving substance adapted to be delivered to the margarine manufacturer in such a form as to be readily and easily available for use.

Another object is to provide a margarine manufacturer with a margarine improving substance which can be easily introduced into and dispersed in the margarine.

Another object is the provision of a margarine improving substance which will not deteriorate or lose its efficacy over a long period of time.

Another object is to produce a margarine having superior smoothness and texture.

Another object is the provision of new products having advantages when used in margarine, but which may have other uses in analogous or totally different arts.

Other objects and features of the invention will be apparent from a consideration of the following detailed description.

The margarine improving substances of our invention in general comprise a compound having the capacity of preventing the spattering of margarine during frying, and intimately mixed therewith a compound having a moisture imbibing capacity such that the cultured milk used in the preparation of the margarine emulsion is more stably bound and will not separate out by leaking or weeping during conditions incident to the manufacture, storage, and use of the margarine. These two substances intimately mixed with each other are prepared preferably in a paste form for easy incorporation into the margarine, but inasmuch as the paste may be prepared in various ways and with different consistencies, and with different types of liquids, we do not confine ourselves to any particular manner or medium for bringing the two improving substances together. We have found that we obtain very much better results when these two types of substances are used together in margarine than if they are used separately. Not only is this true, but we also find that if they are introduced into the margarine after having been intimately admixed beforehand, better results are obtained than if they are used together in the margarine but introduced separately. We are not prepared to explain the reason for this condition, but we shall discuss the same more fully hereinafter.

We have referred to the types of materials used in the preparation, making reference only to two characteristics which they impart in their individual capacities to the margarine. These substances have other marked effects upon the margarine however, which produce margarine superior in other respects. In the following portion of the specification where these substances are treated separately, some of these features will be made clearer.

The anti-spattering compounds of Harris' invention of the type which we prefer to use are described fully in the prior co-pending application, Serial No. 475,622, filed August 15, 1930, as a continuation in part of application Serial No. 383,143, filed August 2, 1929. We refer those skilled in the art to this prior application for an exhaustive treatment of the characteristics of the anti-spatterers per se. In order that those skilled in the art, however, may understand the combination of the present invention, we shall discuss the anti-spatterers briefly.

In the above mentioned copending application a very large number of chemical substances are described which when suitably introduced into margarine have the capacity, when used even in very minute proportions, of markedly reducing or entirely eliminating the spattering which occurs when ordinary types of margarine emulsions are heated in an open pan. These compounds have certain characteristics in common, the most important of which is the presence of balanced lipophile and hydrophile groups in the molecule. By lipophile groups we mean those which have an attraction or affinity for oleaginous media, or which taken alone would dissolve or have a tendency to dissolve in oleaginous substances. Generally speaking, these include the characteristic radicals of fatty acid substances and similar groups which will readily suggest themselves to the skilled chemist, but which are more fully pointed out in the co-pending application hereinabove referred to. For example, the characteristic radicals of the following substances may be termed and may function as lipophile groups: Melissic acid, stearic acid, oleic acid, lauric acid, palmitic acid, lauryl alcohol, cholesterol, monostearine, and other higher molecular weight esters and other substances with marked affinity for oils and fats.

Conversely, by hydrophile groups we mean groups having an affinity for water or tending to dissolve in water. For hydro-phyllic groups we can make use of the phosphoric acids, phosphorous acids, sulphonic acids, amino acids, polybasic carboxylic acids, hydroxy carboxylic acids, and polybasic hydroxy carboxylic acids such as citric, malic, malonic, tartaric, and similar acids, and other groups and molecules with a marked affinity for water.

The compound having the lipophyllic and hydrophyllic groups must possess these groups in such a state of balance as to have an effect in reducing the spattering behavior of margarine, and we have developed a simple test for determining the state of balance between these groups in the molecule. In carrying out the test we place a weighed amount of the margarine containing a definite proportion of the substance the balance in the molecule of which is to be determined, in a small open pan, (an ordinary tablespoon is available for the purpose), and place the same over a Bunsen burner with a properly adjusted flame and with the pan placed at a definite predetermined distance above the burner. Around the Bunsen burner and below the pan, we place a clean blank sheet of paper in such a position that all of the margarine particles which spurt or spatter from the pan during the heating period will be caught by the paper. Using an untreated margarine as a control, the balance in the sample is readily determined from the size and number of spots found on the paper.

Among compounds which we have used with very good results in the composition of the present invention, are the following anti-spatterers:
Palmityl hydrogen sulphate
Potassium palmityl sulphate

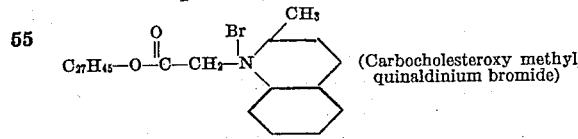 (Carbocholesteroxy methyl quinaldinium bromide)

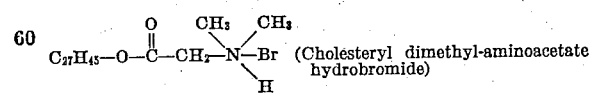 (Cholesteryl dimethyl-aminoacetate hydrobromide)

"Sulphonated" beef tallow
Stearyl diethyleneglycol sulphoacetate, sodium salt

"Stearic acid ester of sucrose"

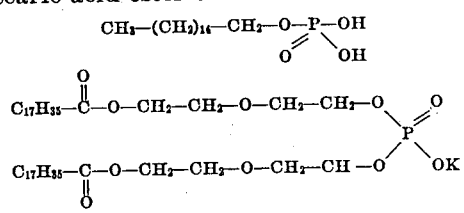

Mannitol monopalmitate

Stearyl malic acid, 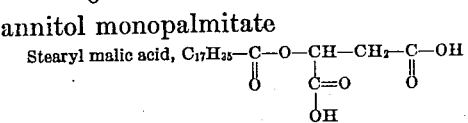

and many other compounds all having lipophile and hydrophile groups in a state of balance.

Among the preferred compounds of our invention for use as anti-spattering substances in combination with hydrophyllic lipins are the sulphonic acid derivatives of substances possessing lipophile groups, these compounds being treated of more specifically in Harris' copending application Serial No. 481,349, filed September 11th, 1930. These substances may be represented by the general formula:

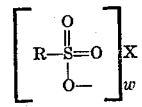

in which "R" is a lipophile radical, "S" represents sulphur linked to oxygen, "O" is oxygen "X" stands for an innocuous cation, and "w" is a small whole number. Of this class the most valuable compounds for our purpose are the carboxylic esters of sulpho-acetic acid, such as a salt of monostearine sulpho-acetate. We have found that the most available for our purpose is the sodium salt of monostearine sulphoacetate.

As the application Serial No. 475,622 discloses, lecithin and nitrogenous lecithin-like extracts have been suggested in the past for use with margarine to prevent the spattering thereof. These compounds have not been commercially satisfactory for several reasons. One of the most objectionable characteristics of these compounds in the past was the fact that they liberated from themselves choline and other objectionable nitrogenous substances which had a tendency to impart a fishy taste to substances in which they were used. These lecithin extracts being of a dark color, also imparted an undesirable color to margarine. It has also been found that some of the objectionable characteristics of lecithin extracts has been due to the presence of impurities, and for this reason attempts have been made to produce lecithins in a pure state. It appears that the tendency of lecithin to decompose and not only lose its value as an anti-spattering substance, but developing unpleasant taste and odor, is increased by purification. We have found that we can employ nitrogenous compounds with some considerable satisfaction when the nitrogenous compounds are admixed with or combined with other substances, such as the hydrophyllic lipins herein discussed. The amount of nitrogenous substance required to be used to effect an improvement in a given quantity of margarine is lessened. This is undoubtedly due to the fact that a more complete dispersion of the anti-spattering substance is obtainable when used with a hydrophyllic lipin than when the anti-spattering substance is used alone. For this reason, although we prefer to avoid the use of certain nitrogenous compounds in margarine alone, they may be used in accordance with the present invention with more satisfactory results, and the present invention is intended to include such use.

The compounds which we term hydrophyllic lipins, which we have found particularly adaptable for use in margarine and similar emulsions in combination with anti-spattering compounds are in general, high acyl and alkyl and similar innocuous derivatives of various polyhydroxy compounds which may be expressed by the general formula $$H_w(CH)_x(OH)_y(OR)_z$$

in which "H, C, and O" represent hydrogen, carbon, and oxygen respectively, "R" denotes acyl or alkyl groups or their derivatives, and "$w, x, y,$ and $z$" are small whole numbers. The acyl and alkyl groups preferably contain at least six carbons. These compounds are described fully in Harris' co-pending application Serial No. 474,308, filed August 9, 1930.

These hydrophyllic lipins in general possess lipophyllic and hydrophyllic groups, but in an insufficient state of balance to affect the spattering behavior of the margarine.

Examples of compounds which can be used in accordance with the present invention are mono-stearic acid ester of glycerine (monostearyl glycerol), monopalmitic acid ester of glycerol, monocetyl ether of glycerol, monomyristyl glycerol, monolauryl glycerol, monomyristyl diethylene glycol, monomelissyl diethylene glycol, mono-palmityl glycerol, mono-oleyl diethylene glycol, mono-oleyl diglycerol, mono-oleyl glycerol, diethylene glycol mono-stearate, 1,6-dilauryl diglycerol, and their equivalents. We also include in this group alkyl and acyl derivatives of sugars, such as dextrose, sucrose, and derivatives of mannitol, sorbitol, poly-glycerols and similar hydroxy compounds which have sufficient of the hydroxy groups esterified or combined with higher molecular weight lipophile groups to make the compound sufficiently oil wetting but insufficiently water wetting to "balance".

These substances will not produce anti-spattering behavior in margarine when the margarine is subjected to frying. They will, however, prevent weeping of the margarine by holding the moisture more securely than is possible without their use. They also permit better control of the margarine to produce a uniform product having a predetermined substantially constant amount of moisture.

These compounds may also be described as derivatives of polyhydroxy substances having the general formula $$(RO)_v X(OH)_w(H)_z$$

wherein 'O' and 'H' are oxygen and hydrogen respectively; '$v$', '$w$', and '$z$' are relatively small whole numbers; 'X' represents the carbon skeleton of a polyhydroxy substance with groups '(OH)' and '(RO)' wherein 'R' is an acyl, alkyl, or some other substantially lipophile group with at least six carbon atoms. We have found that this latter compound in particular functions with very great satisfaction in connection with anti-spattering compounds in the production of a margarine improving substance in the form of a paste and is very easily and readily introduced into the margarine in the usual manufacturing processes.

Among the advantages in the use of our anti-spattering substances and hydrophyllic lipins, together are the following: The action of one of the substances appears to aid the action of the other when they are preliminarily intimately brought together, that is, before their introduction into the margarine. Possibly the dispersion of the two is more thorough when they are so introduced. Since both substances are used in relatively small quantities, obtaining a thorough dispersion is very important if satisfactory results are to be obtained and a uniform margarine product produced. We have found that we may produce a hydrophyllic lipin as a preliminary step in the production of the anti-spattering substance, and the hydrophyllic lipin being subsequently treated, as for example by "sulphonation" to increase the hydrophyllic power in the molecule. The product from the process will be found to be a mixture of a hydrophyllic lipin and an anti-spatterer, the unreacted or partially unreacted material still being present. Instead of employing expensive processes requiring costly equipment for recovering the anti-spatterer in a pure state, we are able to use the crude yield of the process and obtain better results than if the anti-spatterer were first recovered in a pure state. A specific example of a substance obtainable in this way is a mixture of a monostearic acid ester of glycerol and monostearine sulphoacetate sodium salt.

We may, of course, bring our anti-spattering compound and hydrophyllic lipin together after each has been produced in a relatively pure state, or we may use mixtures of more than one anti-spatterer with one or more hydrophyllic lipins without departing from the spirit and scope of the invention. All that is necessary is to obtain an intimate commingling or mixture of the substances used, and this can be brought about by any suitable mixing or homogenizing apparatus known to those skilled in the art. Among the preferred methods is that resulting from the formation of a paste adapted to be used in the margarine.

In preparing the paste we take a mixture of approximately two parts of the hydrophyllic lipin to one part of anti-spattering compound, or equal proportions of these two substances, depending upon the characteristics and activity thereof in margarine. This mixture is then emulsified with sweet milk or water in proportions of about three parts of the mixture to approximately four and one-half parts of the liquid. When the mixture is in a solid or stiff plastic condition at room temperature, as is the case with a mixture of monostearyl glycerol and monostearine sulphoacetate for example, we preliminarily melt the mixture and heat the milk or water to approximately the temperature of the melted mixture. The mixture is then introduced into a beater having a wire loop whip and the hot milk or water is then introduced slowly with constant beating, taking five or ten minutes to introduce all of the milk. Beating is then continued while the substances are allowed to cool to a sufficiently low temperature to produce a paste. If care is not taken during the emulsification, or if the paste emulsion is cooled too quickly, the product may be sandy. This does not prevent it from being used, but impairs its effectiveness somewhat. This paste, after cooling, has the consistency of thick cream, the liquid being in the continuous phase. It can be thinned by the further addition of milk or water, but in any case a product having the desired consistency suitable to permit its addition to the margarine is to be employed.

As to the manner of introducing the substance into the margarine, various processes may be used. It can be introduced into the margarine emulsion after the same has been produced or it can be dispersed in either the oleaginous or aqueous constituents. We have found, however, that the most satisfactory manner of introducing it into the margarine is to knead or blend the same into the margarine, using any of the usual blending or working equipment, such as a "butter worker".

One example of the use of our invention (and which example also exemplifies many of the advantages), is with nitrogenous compounds such as lecithin. Commercial grades of lecithin such as those obtained from soybeans, are dispersed in water or aqueous media only with great difficulty. Continuous grinding and patient exhaustive work are required to obtain a proper dispersion, possibly principally because of the existence of a considerable amount of oil wetting ingredients besides the water wetting ingredients. It is also difficult to introduce lecithin satisfactorily into margarine, particularly after the margarine has been manufactured. This is important, because in actual practice this is the most desirable point in the manufacture for introducing a treating material such as lecithin. Difficulties are encountered if the lecithin is introduced directly without being first treated, as the lecithin is present in such small quantities that without first dispersing the lecithin in another medium it is almost impossible to obtain proper distribution. When lecithin is thinned with an aqueous substance such as water or milk, it is very fluid and it is found to be difficult to introduce a relatively small amount of a fluid mass into a plastic substance such as margarine.

We have found that if we take a commercial lecithin and first dissolve it in monostearyl glycerol and then add milk or water to produce a paste, we can disperse a very small amount of lecithin in a relatively larger amount of milk, water, or other aqueous media, and at the same time, have a heavy paste of butterlike consistency. Such a paste can be incorporated into relatively larger amounts of margarine having substantially the same consistency, with very little difficulty.

We have also found that if lecithin is thinned out directly with cultured milk (which is customarily employed in many establishments) there is a distinct tendency for the milk to "whey off", and we believe that this is directly due to the action of the lecithin on the milk. We have found that when the lecithin is preliminarily dispersed in a hydrophyllic lipin such as monostearyl glycerol, sour milk can be added in any necessary amount for the purpose of thinning the paste, and there will be no tendency whatsoever to "whey off", and the paste will maintain its body even though relatively large amounts of the milk are added.

As an example of the invention, we can incorporate 30 parts of a commercial lecithin which is in a pasty sticky form, into 90 parts of monostearine which has been heated to approximately 160 degrees Fahrenheit, for the purpose of rendering it fluid. When the lecithin has all been incorporated, warmed aqueous media is added with constant stirring with a wire loop whip or other suitable means, allowing the emulsion to cool gradually while being agitated. The resulting product will have a very smooth pasty consistency. If desired, it can then be thinned out with more aqueous liquid without difficulty. In this paste the lecithin is entirely dispersed and the paste can be incorporated into margarine in proportions much less than if the lecithin were to be introduced directly. The tendency to "whey off" is also avoided, as previously set forth, and other practical advantages secured.

Although we described the invention as particularly applicable to margarine, the substances of our invention can be used with good results with any of the culinary preparations which consist in general of emulsions of oleaginous and aqueous constituents, such as the product known as "puff paste" in the baking industry. The term "margarine" therefore, as used in the claims is intended to include all these margarine types of emulsions.

We described the substances of our invention as produced in a paste form in which water or fresh milk are used. It is obvious that they may be produced in other forms, and other liquids such as cottonseed oil for example, may be used with them.

Although the products of our invention are particularly adapted for use in the manufacture of such products as margarine, they may have other uses in analogous or even in other totally different arts. For example, compositions formed of lecithin and mono-stearyl glycerol in the form of a paste have properties which make them suitable wherever wetting and penetrating properties are required, such for example, as in the cosmetic arts. Although the compositions are described and claimed as margarine improving substances, they are not necessarily limited to such use.

What we claim is new and desire to protect by Letters Patent of the United States is:—

1. A margarine improving substance including a chemical compound having balanced lipophile and hydrophile groups and a hydrophyllic lipin having lipophile and hydrophile groups insufficiently balanced to affect the spattering behavior of the emulsion, said substances being substantially uniformly distributed in an aqueous medium.

2. A margarine improving substance including an anti-spattering substance in the form of a chemical compound having balanced lipophile and hydrophile groups, and a hydrophyllic lipin incapable of affecting the spattering behavior of margarine, said lipin being in the form of a derivative of a polyhydroxy substance, said lipin being represented by the general formula

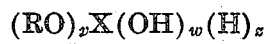

$$(RO)_v X(OH)_w (H)_x$$

wherein 'O' and 'H' are oxygen and hydrogen respectively; 'v', 'w', and 'x' are relatively small whole numbers; 'X' represents the carbon skeleton of a polyhydroxy substance with groups '(OH)' and '(RO)' wherein 'R' is an acyl, alkyl, or some other substantially lipophile group with at least six carbon atoms, said substances being substantially uniformly distributed in an aqueous medium.

3. A margarine improving substance including an anti-spattering substance in the form of a chemical compound having balanced lipophile and hydrophile groups, and a hydrophyllic lipin incapable of affecting the spattering behavior of margarine, said lipin being in the form of a relatively high molecular weight aliphatic derivative of a water soluble polyhydroxy substance and having more than one unesterified hydroxyl group, said substances being substantially uniformly distributed in an aqueous medium.

4. A margarine improving substance including an anti-spattering substance in the form of a chemical compound having balanced lipophile and hydrophile groups, and a hydrophyllic lipin incapable of affecting the spattering behavior of margarine, said lipin being in the form of a mono-fatty acid ester of a water soluble poly-hydroxy substance and having more than one unesterified hydroxyl group, in which the fatty acid group of the ester has at least six carbons, said substances being substantially uniformly distributed in an aqueous medium.

5. A margarine improving substance including an anti-spattering substance in the form of a chemical compound having balanced lipophile and hydrophile groups, and a hydrophyllic lipin incapable of affecting the spattering behavior of margarine, said lipin being in the form of a higher alkyl derivative of a poly-hydroxy compound and having more than one free OH group, said substances being substantially uniformly distributed in an aqueous medium.

6. A margarine improving substance including an anti-spattering substance in the form of a chemical compound having balanced lipophile and hydrophile groups, and a hydrophyllic lipin incapable of affecting the spattering behavior of margarine, said lipin being in the form of a stearic acid ester of a poly-hydroxy compound and having more than one free OH group, said substances being substantially uniformly distrbuted in an aqueous medium.

7. A margarine improving substance including an anti-spattering substance in the form of a chemical compound, having balanced lipophile and hydrophile groups, and a monostearic acid ester of glycerol, said substances being substantially uniformly distributed in an aqueous medium.

8. A margarine improving substance including an anti-spattering substance in the form of a chemical compound having balanced lipophile and hydrophile groups, and an alkyl or acyl derivative of a glycol, said derivative being insufficiently balanced to reduce the spattering of margarine, and said substances being substantially uniformly distributed in an aqueous medium.

9. A margarine improving substance including an anti-spattering substance in the form of a chemical compound having balanced lipophile and hydrophile groups, and diethylene glycol monostearine, said substances being substantially uniformly distributed in an aqueous medium.

10. A margarine improving substance including an anti-spattering compound having balanced lipophile and hydrophile groups forming the general formula

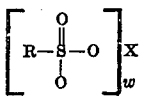

in which "R" is a lipophile radical, "S" represents sulphur linked to carbon, "O" is oxygen, "X" stands for an innocuous cation, and "$w$" is a small whole number; and a hydrophyllic lipin having lipophile and hydrophile groups in an insufficient state of balance to affect the anti-spattering behavior of margarine, said substances being substantially uniformly distributed in an aqueous medium.

11. A margarine improving substance including an anti-spattering compound in the form of a carboxylic ester of sulpho-acetic acid having balanced lipophile and hydrophile groups, and a hydrophyllic lipin having lipophile and hydrophile groups insufficiently balanced to affect the anti-spattering behavior of margarine, said substances being substantially uniformly distributed in an aqueous medium.

12. A margarine improving substance including a salt of monostearine sulphoacetate and a hydrophyllic lipin having lipophile and hydrophile groups insufficiently balanced to affect the anti-spattering behavior of margarine, said substances being substantially uniformly distributed in an aqueous medium.

13. A margarine improving substance including an anti-spattering compound in the form of a nitrogenous compound having balanced lipophile and hydrophile groups, and a hydrophyllic lipin having lipophile and hydrophile groups insufficiently balanced to affect the anti-spattering behavior of margarine, said substances being substantially uniformly distributed in an aqueous medium.

14. A margarine improving substance including lecithin and a hydrophyllic lipin having lipophile and hydrophile groups insufficiently balanced to affect the anti-spattering behavior of margarine, said substances being substantially uniformly distributed in an aqueous medium.

15. A margarine improving substance including a salt of monostearine sulphoacetate and a hydrophyllic lipin incapable of affecting the spattering behavior of margarine, said lipin being in the form of a derivative of a polyhydroxy substance and having the general formula $$(RO)_v X(OH)_w (H)_z$$

wherein "O" and "H" are oxygen and hydrogen respectively; "$v$", "$w$", and "$z$" are relatively small whole numbers; "X" represents the carbon skeleton of a polyhydroxy substance with groups "(OH)" and "(RO)" wherein "R" is an acyl, alkyl, or some other substantially lipophile group with at least six carbon atoms, said substances being substantially uniformly distributed in an aqueous medium.

16. A margarine improving substance including a salt of monostearine sulphoacetate and a monostearic acid ester of glycerol, substantially uniformly distributed in an aqueous medium.

17. A margarine improving substance including a nitrogenous compound having balanced lipophile and hydrophile groups and a hydrophyllic lipin incapable of affecting the spattering behavior of margarine, said lipin being in the form of a derivative of a polyhydroxy substance and having the general formula $$(RO)_v X(OH)_w (H)_z$$

wherein "O" and "H" are oxygen and hydrogen respectively; "$v$", "$w$", and "$z$" are relatively small whole numbers; "X" represents the carbon skeleton of a polyhydroxy substance with groups "(OH)" and "(RO)" wherein "R" is an acyl, alkyl, or some other substantially lipophile group with at least six carbon atoms, said substances being substantially uniformly distributed in an aqueous medium.

18. A margarine improving substance including lecithin and a hydrophyllic lipin incapable of affecting the spattering behavior of margarine, said lipin being in the form of a derivative of a polyhydroxy substance and having the general formula $$(RO)_v X(OH)_w (H)_z$$

wherein "O" and "H" are oxygen and hydrogen respectively; "$v$", "$w$", and "$z$" are relatively small whole numbers; "X" represents the carbon skeleton of a polyhydroxy substance with groups "(OH)" and "(RO)" wherein "R" is an acyl, alkyl, or some other substantially lipophile group with at least six carbon atoms, said substance being substantially uniformly distributed in an aqueous medium.

19. A margarine improving substance including a nitrogenous compound having balanced lipophile and hydrophile groups, and a monostearic acid ester of glycerol, said substances being substantially uniformly distributed in an aqueous medium.

20. A margarine improving substance including lecithin and a monostearyl glycerol, substantially uniformly distributed in an aqueous medium.

21. The method of producing an improved margarine which comprises producing an intimate hydrated mixture of an antispattering substance having balanced lipophile and hydrophile groups, and a hydrophillic lipin having lipophile and hydrophile groups insufficiently balanced to affect the spattering behavior of margarine, forming an emulsion of oleaginous and aqueous materials and introducing the mixture into such emulsion.

22. The method of producing an improved margarine which comprises producing an intimate mixture of an antispattering substance having balanced lipophile and hydrophile groups, and a hydrophillic lipin having lipophile and hydrophile groups insufficiently balanced to affect the spattering behavior of margarine, forming a liquid emulsion of oleaginous and aqueous materials, solidifying the emulsion to form a plastic butter-like mass, incorporating aqueous material with the mixture to form a paste, and working the paste into the solid plastic emulsion to form the completed margarine.

23. A composition of matter comprising a hydrophyllic lipin incapable of reducing spattering in margarine and lecithin, substantially uniformly distributed in an aqueous medium.

24. A composition of matter comprising monostearyl glycerol, and lecithin substantially uniformly distributed in an aqueous medium.

25. As a new article of manufacture, a plastic emulsion of semi-solid consistency, having oleaginous and aqueous media, and having included therein a relatively small proportion of an anti-spattering compound having balanced lipophile and hyrophile groups and a hydrophyllic lipin incapable of affecting the spattering behavior of margarine, said lipin being in the form of a derivative of a polyhydroxy substance, and having the general formula $$(RO)_v X(OH)_w (H)_z$$

wherein "O" and "H" are oxygen and hydrogen respectively; "$v$", "$w$", and "$z$" are relatively small whole numbers; "X" represents the carbon skeleton of a polyhydroxy substance with groups "(OH)" and "(RO)" wherein "R" is an acyl, alkyl or some other substantially lipophile group with at least six carbon atoms, said substances being substantially uniformly distributed in an aqueous medium.

26. The method of producing an improved plastic emulsion of semi-solid consistency which comprises forming a plastic emulsion of aqueous and oleaginous materials, forming a paste comprising an anti-spattering substance having balanced lipophile and hydrophile groups and a hydrophyllic lipin having lipophile and hydrophile groups insufficiently balanced to affect the spattering behavior of margarine, said substances being uniformly distributed in an aqueous medium, and incorporating said paste in the plastic emulsion.

27. The method of producing an improved plastic emulsion having oleaginous and aqueous constituents which comprises forming a paste of an anti-spattering substance having balanced lipophile and hydrophile groups and a hydrophyllic lipin having lipophile and hydrophile groups in an insufficient state of balance to affect the spattering behavior of margarine, said substances being substantially uniformly distributed in an aqueous medium, and introducing said paste into the emulsion.

In witness whereof, we hereunto subscribe our names this 18th day of Oct., 1930.

ALBERT K. EPSTEIN.
BENJAMIN R. HARRIS.